(12) United States Patent
Shan (10) Patent No.: US 11,674,702 B2
(45) Date of Patent: Jun. 13, 2023

(54) AIR DUCT DEVICE AND AIR HANDLING APPARATUS

(71) Applicant: BEIJING XIAOMI MOBILE SOFTWARE CO., LTD., Beijing (CN)

(72) Inventor: Lianyu Shan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 361 days.

(21) Appl. No.: 17/011,907

(22) Filed: Sep. 3, 2020

(65) Prior Publication Data
US 2021/0318005 A1    Oct. 14, 2021

(30) Foreign Application Priority Data

Apr. 9, 2020   (CN) .......................... 202010275929.0

(51) Int. Cl.
| | |
|---|---|
| F24F 7/06 | (2006.01) |
| F24F 11/88 | (2018.01) |
| F24F 13/06 | (2006.01) |
| F24F 13/08 | (2006.01) |
| F24F 13/20 | (2006.01) |
| F24F 13/28 | (2006.01) |
| F24F 13/30 | (2006.01) |
| F24F 13/32 | (2006.01) |

(52) U.S. Cl.
CPC ................ *F24F 7/06* (2013.01); *F24F 11/88* (2018.01); *F24F 13/06* (2013.01); *F24F 13/08* (2013.01); *F24F 13/20* (2013.01); *F24F 13/28* (2013.01); *F24F 13/30* (2013.01); *F24F 13/32* (2013.01); *F24F 2221/34* (2013.01)

(58) Field of Classification Search
CPC ...... F24F 1/0007; F24F 1/0035; F24F 1/0057; F24F 1/0073; F24F 7/06; F24F 7/065; F24F 11/88; F24F 13/06; F24F 13/08; F24F 13/12; F24F 13/28; F24F 13/30; F24F 13/32
USPC .......................................................... 454/228
See application file for complete search history.

(56) References Cited

U.S. PATENT DOCUMENTS

2007/0079619 A1* 4/2007 Hamada ................ F24F 1/0083
                                                                  62/186

FOREIGN PATENT DOCUMENTS

| CN | 2861834 Y | * | 1/2007 | |
|---|---|---|---|---|
| CN | 107131557 A | | 9/2017 | |
| CN | 108731107 A | * | 11/2018 | ............ F24F 1/0007 |
| EP | 1 079 183 A2 | | 2/2001 | |

OTHER PUBLICATIONS

Extended European Search Report dated Feb. 24, 2021 in European Patent Application No. 20197989.5, 7 pages.

* cited by examiner

*Primary Examiner* — Allen R. B. Schult
(74) *Attorney, Agent, or Firm* — Oblon, McClelland, Maier & Neustadt, L.L.P.

(57) ABSTRACT

The present disclosure relates to an air duct device and an air handling apparatus. The air duct device can include a first air duct and a second air duct. The first air duct has an air inlet and an air outlet. The second air duct has an air input channel passing by the air outlet of the first air duct, and an air outlet that is in communication with the first air duct.

20 Claims, 4 Drawing Sheets

AIR DUCT DEVICE AND AIR HANDLING APPARATUS

CROSS REFERENCE TO RELATED APPLICATION

This application is based on and claims priority to Chinese Patent Application No. 202010275929.0, filed on Apr. 9, 2020, the entire content of which is incorporated herein by reference.

TECHNICAL FIELD

The present disclosure relates to a field of air conditioning technology, including an air duct device and an air handling apparatus.

BACKGROUND

An air conditioner, namely an air regulating device, is a kind of apparatus used to regulate and control a temperature, a humidity, a flow rate, and other parameters of an ambient air in buildings or structures through artificial means. Generally, the air conditioner includes several mains parts such as a cold source apparatus/a heat source apparatus, a cold and hot medium transmission and distribution system, a terminal device and other auxiliary apparatus. The air conditioner mainly includes a cooling host, a water pump, a fan and a pipeline system. The terminal device is configured for using the transmitted and distributed cold energy and heat energy to specifically deal with an air state, such that the air parameters of a target environment can meet the requirements. At present, an ordinary air duct system and a ventilation duct of the air conditioner generally are arranged individually, such that an introduction of outdoor air tends to cause drastic changes of an indoor temperature.

SUMMARY

A first aspect of the present disclosure provides an air duct device, including a first air duct and a second air duct. The first air duct has an air inlet and an air outlet. The second air duct has an air input channel passing by the air outlet of the first air duct, and an air outlet communicated with the first air duct.

A second aspect of the present disclosure also provides an air handling apparatus including an air duct device, and the air duct device includes a first air duct and a second air duct. The first air duct has an air inlet and an air outlet. The second air duct has an air input channel passing by the air outlet of the first air duct, and an air outlet communicated with the first air duct.

Other features and advantages of the present disclosure will be illustrated in subsequent specifications, and partly becomes apparent from the description or is appreciated by the implementation of the present disclosure. The object and other advantages of the present disclosure can be achieved and obtained by a structure specially pointed out in the description and the drawings.

Technical solutions of the present disclosure are further described in detail with reference to the drawings and exemplary embodiments.

BRIEF DESCRIPTION OF THE DRAWINGS

The accompanying drawings, which constitute a part of this specification, illustrate exemplary embodiments and are used to provide a further understanding of the present disclosure, together with the description, serve to explain the principles of the disclosure, and cannot be constituted as a limitation to the present disclosure.

DETAILED DESCRIPTION

The exemplary embodiments of the present disclosure will be described below with reference to the accompanying drawings. It should be understood that the exemplary embodiments described herein are merely used to illustrate and explain the present disclosure, and should not be construed as a limitation to the present disclosure.

Figure 1:
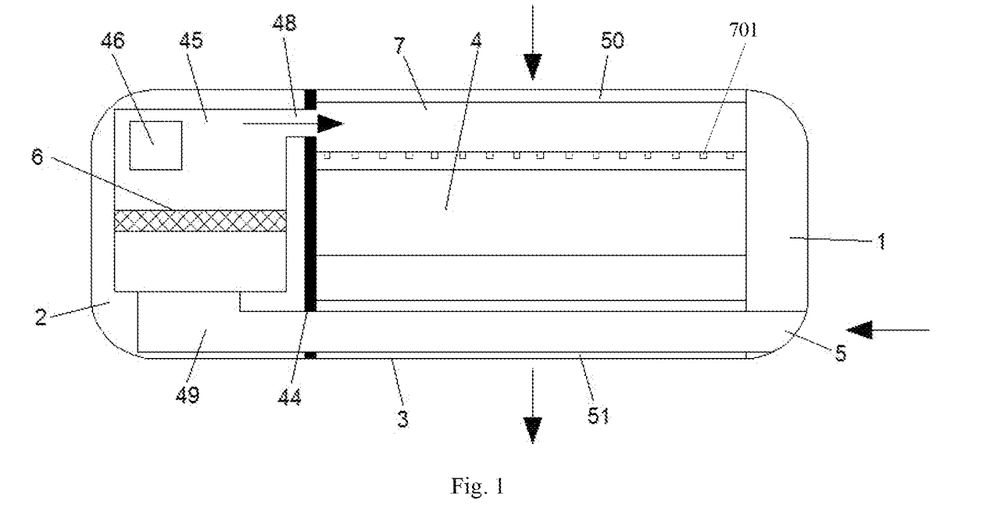
FIG. 1 is a schematic view of an air duct device according to an embodiment of the present disclosure.

Embodiments of the present disclosure provide an air duct device, as illustrated in FIG. 1. The air duct device includes a first air duct 1 and a second air duct 2. An air input channel 49 of the second air duct 2 passes by an air outlet of the first air duct 1, and an air outlet of the second air duct 2 is communicated with the first air duct 1. The first air duct 1 and the second air duct 2 are arranged in a same housing 3, the housing 3 is provided with a baffle 44 therein, the baffle 44 is configured to isolate the first air duct 1 from the second air duct 2, and the baffle 44 is provided with a hole through which the air input channel 49 of the second air duct 2 passes.

The baffle 44 is configured to isolate the first air duct 1 from the second air duct 2, so as to prevent a mutual influence of the respective air directions of the first air duct 1 and the second air duct 2, and the housing 3 is configured to arrange the first air duct 1 and the second air duct 2 together and to mount or place the first air duct 1 and the second air duct 1 in the indoor environment, thus achieving the purpose for ventilation or temperature and humidity regulation to the indoor environment.

The first air duct 1 is a heat-exchange air duct, and the second air duct 2 is a ventilation duct. The air input channel of the second air duct 2 passes by the air outlet of the first air duct 1, and thus the air input channel of the second air duct 2 passing by the air outlet of the first air duct 1 also has the heat exchange with the first air duct 1, such that the air entering the second air duct 2 from the air input channel is heated or cooled by the air at the air outlet of the first air duct 1. The air outlet of the second air duct 2 is communicated with an air inlet of the first air duct, and thus the air preheated or precooled by the air outlet of the first air duct 1 enters the air inlet of the first air duct 1 after being purified, such that the purified air can enter the first air duct 1 for heat exchange. Repeated in this manner, the heat exchange efficiency of the air passing through the second air duct 2 can also be improved, and a traditional situation that a temperature difference between an input/output air and an indoor air is relatively large during the single air purification process is avoided.

When an outdoor air entering the second air duct 2 from the air input channel passes by the air outlet of the first air duct 1, the outdoor air is preheated or precooled by a heat exchange air in the first air duct 1, then is transported to the air inlet of the first air duct 1 via the air outlet of the second air duct 2 to converge with the heat exchange air in the air outlet of the first air duct 1, and finally diffuses into the indoor environment, thus effectively reducing the difference between a temperature of the outdoor air entering the indoor environment and a temperature in the indoor environment, and preventing drastic changes of the temperature in the indoor environment due to the introduction of the outdoor air.

Moreover, the air purified by the second air duct 2 is circularly discharged via the first air duct 1, thus facilitating the purified air to diffuse in the indoor environment, so as to improve the indoor purification efficiency. Additionally, the first air duct 1 and the second air duct 2 are arranged in the same housing 3 so as to achieve the miniaturization of the mounting structure of the air duct device, and also to avoid a cost increase caused by the individual designs of the heat-exchange air duct and the air purification channel in the related art.

Embodiments of the present disclosure also provide an air handling apparatus, including an air duct device, and the air duct device includes a first air duct 1 and a second air duct 2. The first air duct 1 is a heat-exchange air duct, the second air duct 2 is a ventilation duct, and the first air duct 1 and the second air duct 1 are arranged in a same housing 3.

The air input channel of the second air duct 2 passes by the air outlet of the first air duct 1, and thus the air input channel of the second air duct 2 passing by the air outlet of the first air duct 1 also has the heat exchange with the first air duct 1, such that the air entering the second air duct 2 from the air input channel is heated or cooled by the air at the air outlet of the first air duct 1. The air outlet of the second air duct 2 is communicated with an air inlet of the first air duct, and thus the air preheated or precooled by the air outlet of the first air duct 1 enters the air inlet of the first air duct 1 after being purified, such that the purified air can enter the first air duct 1 for heat exchange. Repeated in this manner, the heat exchange efficiency of the air passing through the second air duct 2 can also be improved, and a traditional situation that a temperature difference between an input/output air and an indoor air is relatively large during the single air purification process is avoided.

When an outdoor air entering the second air duct 2 from the air input channel passes by the air outlet of the first air duct 1, the outdoor air is preheated or precooled by a heat exchange air in the first air duct 1, then is transported to the air inlet of the first air duct 1 via the air outlet of the second air duct 2 to converge with the heat exchange air in the air outlet of the first air duct 1, and finally diffuses into the indoor environment, thus effectively reducing the difference between a temperature of the outdoor air entering the indoor environment and a temperature in the indoor environment, and preventing drastic changes of the temperature in the indoor environment due to the introduction of the outdoor air.

Moreover, the air purified by the second air duct 2 is circularly discharged via the first air duct 1, thus facilitating the purified air to diffuse in the indoor environment, so as to improve the indoor purification efficiency. Additionally, the first air duct 1 and the second air duct 2 are arranged in the same housing so as to achieve the miniaturization of the mounting structure of the air duct device, and also to avoid a cost increase caused by the individual designs of the heat-exchange air duct and the air purification channel in the related art.

Figure 6:
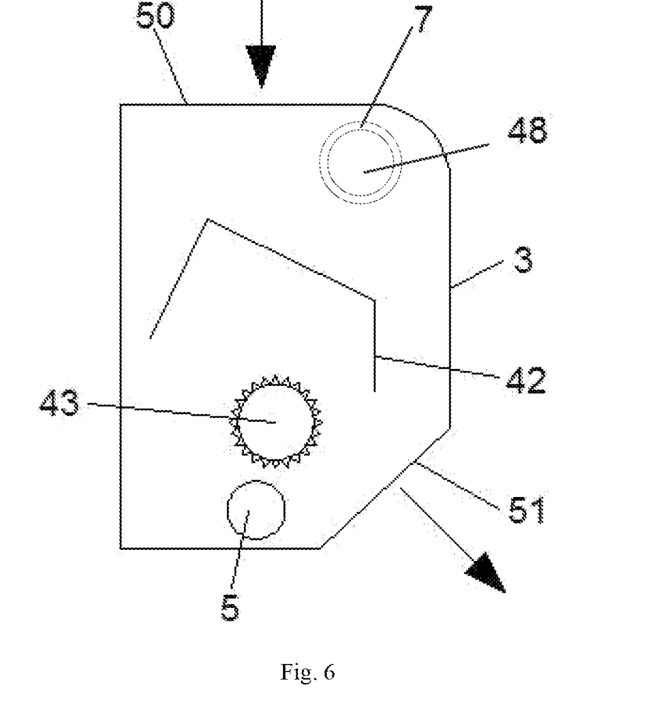
FIG. 6 is a schematic view of an air output pipe, a heat exchange fin and a fan of an air duct device according to an embodiment of the present disclosure.

In some embodiments as illustrated in FIG. 1 and FIG. 6, the first air duct 1 is a heat-exchange air duct, the air inlet of the first air duct 1 is an inlet 50 of the heat-exchange air duct, the air outlet of the first air duct 1 is an outlet 51 of the heat-exchange air duct, a heat exchange unit 4 is arranged between the inlet 50 of the heat-exchange air duct and the outlet 51 of the heat-exchange air duct, and the air input channel 49 of the second air duct 2 is arranged inside the housing 3 and adjacent to the outlet 51 of the heat-exchange air duct.

The heat exchange unit 4 is configured to exchange heat with the air flowing through the first air duct 1, so as to achieve the temperature regulation.

As illustrated in FIG. 1 and FIG. 6, the heat exchange unit 4 includes a heat exchange fin 42 which has a U-shaped structure, an end of the U-shaped structure facing away from an opening thereof is orientated towards the inlet 50 of the heat-exchange air duct, and the outlet 51 of the heat-exchange air duct is arranged adjacent to the opening of the U-shaped structure. A first fan 43 is arranged adjacent to the opening of the U-shaped structure of the heat exchange unit 4 and is fixed inside the housing 3.

The opening of the U-shaped structure of the heat exchange fin 42 is arranged towards a lower part of the housing 3, and the other end of the heat exchange fin 42 is arranged towards the inlet 50 of the heat-exchange air duct, such that when the heat exchange fin 42 has a heat exchange with the air flowing through the first air duct 1 the air after the heat exchange efficiently disperses out of the outlet 51 of the heat-exchange air duct, thereby achieving the heat exchange with the indoor environment.

The first fan 43 is configured to discharge the air after the heat exchange in the first air duct 1, further improving the heat exchange efficiency of the first air duct 1 during the heat exchange, and accelerating the increase or decrease of the indoor temperature.

As illustrated in FIG. 1 and FIG. 6, an air outlet of the second air duct 2 is arranged in a baffle 44 and an air output pipe 7 of the second air duct 2 extends into the first air duct 1. The air output pipe 7 extends from the outlet of the second air duct 2 to a side of the first air duct 1 away from the second air duct 2, and a surface of the air output pipe 7 adjacent to the heat exchange unit 4 is provide with a plurality of flow equalization holes 701 spaced apart from one another. An air direction of the air output pipe 7 of the second air duct 2 is perpendicular to an air direction of the inlet 50 of the heat-exchange air duct. The air output pipe 7 of the second air duct 2 is located between the heat exchange unit 4 and the inlet 50 of the heat-exchange air duct.

An outer diameter of the air output pipe 7 is smaller than an inner diameter of the inlet 50 of the heat-exchange air duct, such that the purified air from the second air duct 2 and the air introduced by the first air duct 1 can enter the heat exchange unit 4 to exchange heat without a mutual interference therebetween, and then are discharged to the indoor environment via the inlet 51 of the heat-exchange air duct, so as to exchange heat with the indoor environment while purifying the indoor air.

An outer diameter of the air input channel 49 is smaller than an inner diameter of the outlet 51 of the heat-exchange air duct, such that the air after the heat exchange can be better diffused by the outlet 51 of the heat-exchange air duct.

Moreover, after the air passing through the air input channel 49 is preheated via the outlet 51 of the heat-exchange air duct, the air arriving at a purification chamber can be preheated, such that the air discharged from the purification chamber 45 to the inlet 50 of the heat-exchange air duct is the preheated outdoor air.

The air input channel 49 may run through the baffle and the side wall of the housing, and be communicated with an outside of the housing, so as to achieve the introduction of the outdoor air to the purification chamber.

An outer side wall of the air input channel 49 may also be fitted with an inner wall of the housing or an inner wall of the outlet of the heat-exchange air duct, so as to achieve the purpose of preheating the air flowing through the air input channel 49 by the heat exchange air discharged from the outlet of the heat-exchange air duct. Since the outer diameter of the air input channel 49 is smaller than the inner diameter of the outlet of the heat-exchange air duct, the air input channel will not affect the air discharge of the outlet of the heat-exchange air duct.

The flow equalization hole is configured to evenly diffuse the outdoor air in the air output pipe 7 into the first air duct 1. The air output pipe 7 is configured to smoothly guide the purified outdoor air from the air outlet of the second air duct 2 to the air inlet 51 of the first air duct 1, and then the outdoor air is discharged via the air outlet 51 of the first air duct 1 after exchanging heat with the heat exchange unit 4, such that the air purified by the second air duct 2 can have a pre-heat exchange and the purified air can be more effectively diffused into the indoor environment, thus effectively reducing the vortex accumulation in the traditional ventilation system.

As illustrated in FIG. 1 and FIG. 6, the second air duct 2 is a ventilation duct. The air outlet of the second air duct 2 is a fresh air outlet 48, the fresh air outlet 48 is communicated with the air inlet of the first air duct 1, and the air input channel 49 passes through the baffle 44 and goes by the air outlet of the first air duct 1. In other embodiments, the fresh air outlet 48 may be directly communicated with the outside of the housing 3. The purification chamber 45 is arranged between the fresh air outlet 48 and the air input channel 49. The air input channel 49 includes an outdoor air inlet 5 located at a side of the air outlet of the first air duct 1 away from the second air duct 2, and the outdoor air inlet 5 runs through the side wall of the housing 3 to be communicated with an outdoor environment, such that the outdoor air in the outdoor environment can enter the air input channel 49 and further the purification chamber 45 through the outdoor air inlet 5. The purification chamber 45 is provided with a filter 6 and a second fan 46 therein, and the second fan 46 is located between the filter 6 and the fresh air outlet 48. In some embodiments, the filter 6 may be a filter screen. An air direction of the air input channel 49 is perpendicular to an air direction of the inlet 51 of the heat-exchange air duct.

Through the second fan 46 and the outdoor air inlet 5 of the second air duct 2, the outdoor air is introduced to the purification chamber 45 and then the air is filtered by the filter 6 arranged in the purification chamber 45, such that the air introduced into the purification chamber 45 through the outdoor air inlet 5 is filtered and purified into a fresh air, then the fresh air flows to the air output pipe 7 via the fresh air outlet 48, then the air output pipe 7 evenly divides the fresh air through the flow equalization holes 701 to the inlet 50 of the heat-exchange air duct, and the fresh air is discharged via the outlet 51 of the heat-exchange air duct after exchanging heat with the heat exchange unit 4, such that the air discharged out of the first air duct 1 includes the fresh air and also the heat exchange air, thus facilitating the fresh air to diffuse in the indoor environment, and also avoiding the large temperature difference between the fresh air and the indoor air when the fresh air is directly discharged.

In some embodiments, the second fan 46 is arranged between the filter 6 and the fresh air outlet 48, and the second fan 46 is arranged adjacent to the fresh air outlet 48. By arranging the second fan 46 adjacent to the fresh air outlet 48, the purification chamber 45 discharges the fresh air to the indoor environment and the purification efficiency of the second air duct 2 is improved. Further, the second fan 46 is arranged between the filter 6 and the air input channel 49, thereby more air introduced by the air input channel 49 can enter the purification chamber 45, and then discharged via the fresh air outlet 48 to the indoor environment after being purified by the purification chamber 45.

In some embodiments, two second fans 46 are arranged on two sides of the filter 6, respectively. One second fan 46 is arranged adjacent to the air input channel 49, and the other second fan 46 is arranged adjacent to the fresh air outlet 48, such that the air input channel 49 can introduce more air into the purification chamber 45, and the purified air can be more effectively discharged to the indoor environment by the second fan 46 adjacent to the fresh air outlet 48 after being purified by the purification chamber 45.

The air input channel 49 and the air output pipe 7 are both configured as pipelines, such as metal pipelines or plastic pipelines of materials consistent with that of the housing. The pipeline may be separately molded or integrally molded with the housing.

Since the air direction of the air input channel 49 is perpendicular to the air direction of the inlet 51 of the heat-exchange air duct, the air in the first air duct 1 after the heat exchange can preheat the air input channel 49 passing by the outlet 51 of the heat-exchange air duct, such that the air flowing through the air input channel 49 to the purification chamber 45 is the air after the heat exchange, thus avoiding the situation that the heat exchange efficiency is reduced due to a relatively low temperature of the air discharged from the purification chamber 45 to the outlet 51 of the heat-exchange air duct. By preheating the air to be purified for the first time, and then exchanging heat with the purified air for the second time, and repeated in this manner, the outdoor air can be purified, the heat exchange efficiency of the outdoor air after the purification can be improved, and the energy loss of the heat exchange unit during the heat exchange can be reduced.

In the embodiments, by precooling/preheating the air in the second air duct, the difference between the temperature of the fresh air entering the indoor environment and the temperature in the indoor environment can be effectively reduced, thus preventing drastic changes of the temperature in the indoor environment due to the introduction of the fresh air into the indoor environment. Moreover, the air output pipe of the second air duct evenly disperses the fresh air or blows the fresh air to the air inlet of the first air duct, and then the fresh air is quickly sent to the indoor environment by the first fan of the first air duct, so as to prevent the vortex accumulation of the fresh air.

Through the heat exchange of the air outlet of the first air duct with the air input channel of the second air duct, the difference of temperature of the fresh air introduced to the indoor and the indoor temperature is reduced, and the fluctuation of the indoor temperature is reduced. Moreover, the first air duct and the second air duct are integrated together to effectively and quickly send the fresh air to the indoor environment.

In the embodiments, a fresh air conditioner uses the same air duct system as a traditional cooling/heating air conditioner, which effectively reduces the structure size of the fresh air conditioner, decreases the cost, achieves the heat exchange with the indoor air, reduces the indoor temperature fluctuation, and improves the indoor comfort. The traditional appearance structure of the air conditioner is adopted, and the internal structure of the air conditioner is redesigned. Specifically, the structure of the ventilation system is integrated in the housing of the air conditioner, a joint structure design of the air outlet of the air conditioner and the outdoor air input pipeline is carried out, the outdoor air is preheated/precooled by the air from the air conditioner, and the influence of the outdoor air on the indoor temperature is reduced. Moreover, the fresh air outlet of the ventilation system is also evenly distributed at the air inlet of the air conditioner, and through the circulation of the indoor air by means of the fan of the air conditioner, the fresh air is evenly sent to every part of the indoor environment.

This technical solution can be mainly applied in the domestic air-conditioning scenes, but not limited to the air-conditioning scenes, which can also be applied to domestic air management unit scenes including air purification scenes and fresh air ventilator scenes.

Figure 5:
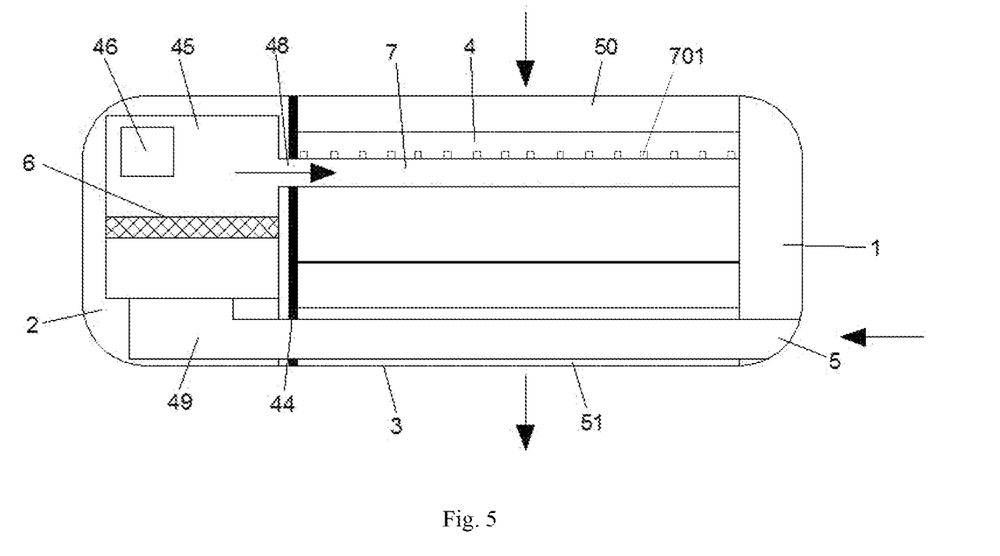
FIG. 5 is a schematic view of an air duct device according to another embodiment of the present disclosure.
Figure 7:
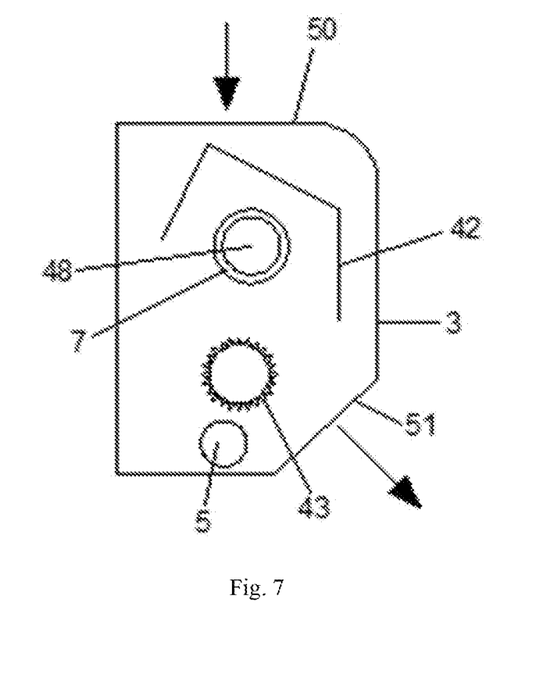
FIG. 7 is a schematic view of an air output pipe, a heat exchange fin and a fan of an air duct device according to another embodiment of the present disclosure.

In other embodiments as illustrated in FIG. 5 and FIG. 7, the air output pipe 7 of the second air duct 2 is arranged in the opening of the U-shaped structure of the heat exchange unit 4, and is located above the first fan 43.

The air output pipe 7 is configured as a pipeline, such as a metal pipe or a plastic pipe of materials consistent with that of the housing. The pipeline may be separately molded or integrally molded with the housing. In some embodiments, the air output pipe 7 is surrounded by the U-shaped structure of the heat exchange unit 4 and is adjacent to any inner wall (for example, a top inner wall as illustrated in FIG. 5) of the U-shaped structure. Accordingly, a surface of the air output pipe 7 adjacent to the top inner wall of the U-shaped structure is provide with a plurality of flow equalization holes 701 spaced apart from one another, as illustrated in FIG. 5.

An outer diameter of the air output pipe 7 is smaller than an inner diameter of the inlet 50 of the heat-exchange air duct, such that the purified air from the second air duct 2 and the air introduced by the first air duct 1 can enter the heat exchange unit 4 to exchange heat without a mutual interference therebetween, and then are discharged to the indoor environment via the inlet 51 of the heat-exchange air duct, so as to exchange heat with the indoor environment while purifying the indoor air.

By arranging the air output pipe 7 between the first fan 43 and the heat exchanger unit 4, and also arranging the air output pipe 7 in the opening of the U-shaped structure of the heat exchanger unit 4, the heat exchanger unit 4 can exchange heat with the air output pipe 7 effectively during the heat exchange process, and the heat exchange efficiency of the air flowing from the second air duct 2 to the first air duct 1 can be further improved, such that the purified air has a pre-heat exchange, and also the fresh air after being heated can be further diffused into the indoor environment by the first fan 43 in the first air duct 1.

In the embodiments, a fresh air conditioner uses the same air duct system as a traditional cooling/heating air conditioner, which effectively reduces the structure size of the fresh air conditioner, decreases the cost, achieves the heat exchange with the indoor air, reduces the indoor temperature fluctuation, and improves the indoor comfort. The traditional appearance structure of the air conditioner is adopted, and the internal structure of the air conditioner is redesigned. Specifically, the structure of the ventilation system is integrated in the housing of the air conditioner, a joint structure design of the air outlet of the air conditioner and the outdoor air input pipeline is carried out, the outdoor air is preheated/precooled by the air from the air conditioner, and the influence of the outdoor air on the indoor temperature is reduced. Moreover, the fresh air outlet of the ventilation system is also evenly distributed at the air inlet of the air conditioner, and through the circulation of the indoor air by means of the fan of the air conditioner, the fresh air is evenly sent to every part of the indoor environment.

This technical solution can be mainly applied in the domestic air-conditioning scenes, but not limited to the air-conditioning scenes, which can also be applied to domestic air management unit scenes including air purification scenes and fresh air ventilator scenes.

Figure 2:
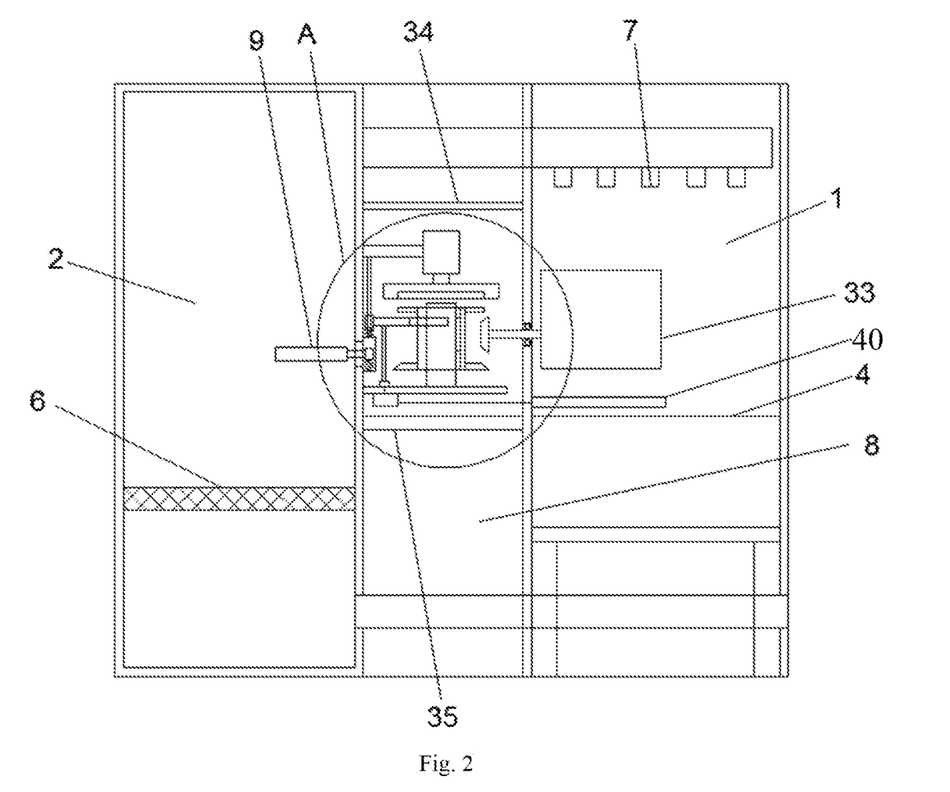
FIG. 2 is a schematic view of an air speed regulating device of an air duct device according to an embodiment of the present disclosure.
Figure 3:
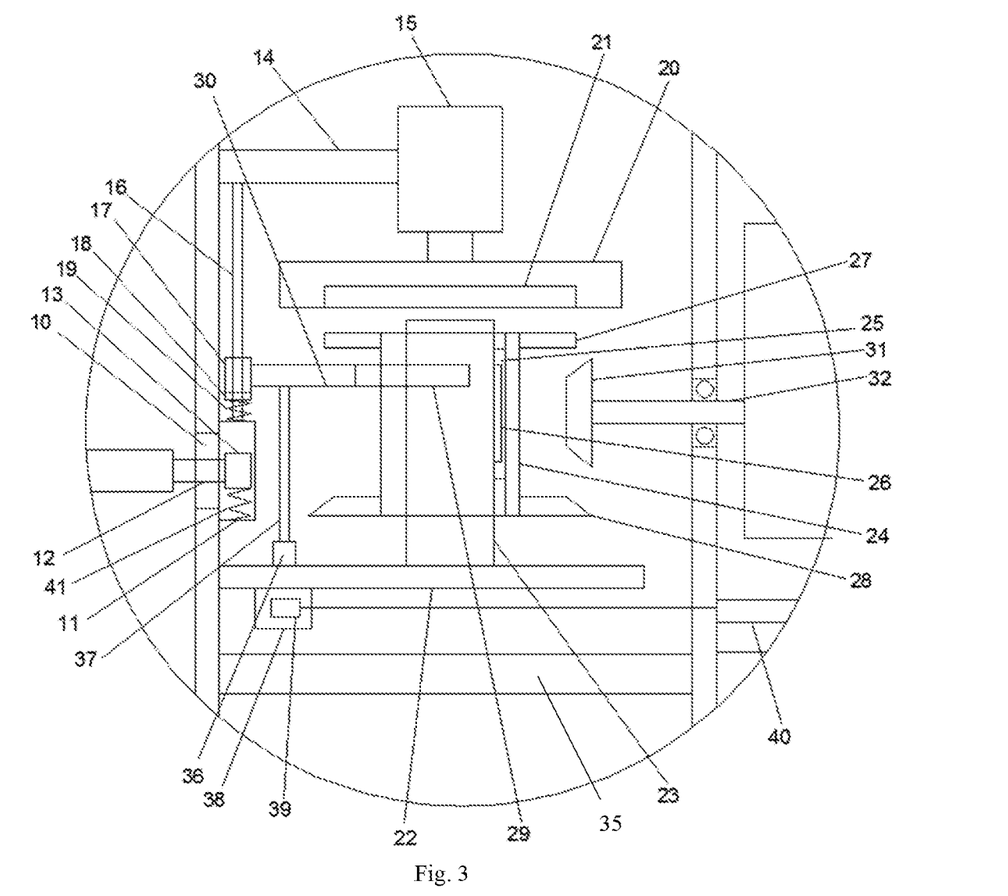
FIG. 3 is an enlarged view of a part A in FIG. 2.
Figure 4:
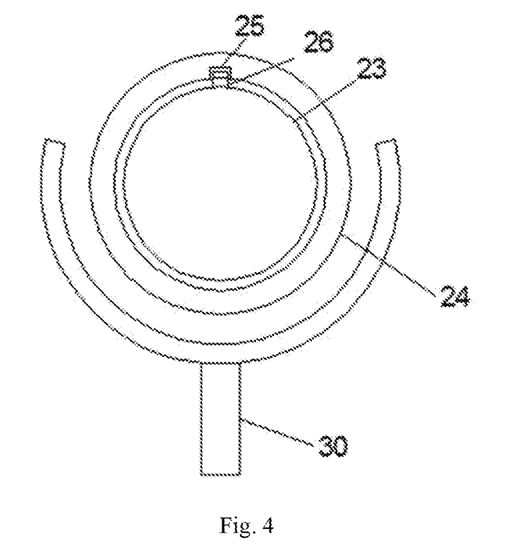
FIG. 4 is a top view of a part of the air speed regulating device in FIG. 2.

In some embodiments of the present disclosure, as illustrated in FIGS. 2-4, an air speed regulating device is also provided, and the air speed regulating device includes a power chamber 8, an air plate 9, a support rod 14, a first connecting rod 16, a second spring 19, a support plate 22, a sleeve 24, a semicircular shifting fork 29, a second bevel gear 31, and so on.

The power chamber 8 is arranged between the first air duct 1 and the second air duct 2. The air plate 9 is arranged in the second air duct 2. A guide port 10 is arranged in a wall of the second air duct 2 and extends along a length direction thereof, the power chamber 8 is provided with a receptacle 11 therein, and the guide port 10 is communicated with the receptacle 11. One end of a connecting post 12 is connected with the air plate 9, the other end of the connecting post 12 passes through the guide port 10, extends into the receptacle 11 and is connected with a first magnet 13. The receptacle 11 is provided with a first spring 41 therein, one end of the first spring 41 is connected with the first magnet 13, the other end of the first spring 41 is connected with a bottom of an inner wall of the receptacle 11, and the first magnet 13 can reciprocate up and down in the receptacle 11.

One end of the support rod 14 is connected with an inner wall of the power chamber 8, and the other end of the support rod 14 is connected with an outer wall of a motor 15. An output shaft of the motor 15 faces downwards and is connected with a rotary disk 20. A bottom end of the rotary disk 20 is provided with an engaging groove 21, the engaging groove 21 is circular, and several tooth slots are formed in an inner wall of the engaging groove 21 along a circumferential direction.

One end of the first connecting rod 16 is connected with an upper end of the receptacle 11, and the other end of the first connecting rod 16 is connected with the support rod 14. A sliding sleeve 17 is fitted over the first connecting rod 16, and can reciprocate up and down along the first connecting rod 16. A second magnet 18 is arranged to a lower end of the sliding sleeve 17, and the magnetic poles of the first magnet 13 and the second magnet 18 are opposite.

The second spring 19 is fitted over the first connecting rod 16, one end of the second spring 19 is connected with the second magnet 18, and the other end of the second spring 19 is connected with a top end of the receptacle 11.

The support plate 22 is arranged below the receptacle 11, and a first rotating shaft 23 is arranged on the support plate 22. One end of the first rotating shaft 23 is rotatably connected with the support plate 22, and the other end of the first rotating shaft 23 extends towards the engaging groove 21.

The sleeve 24 is fitted over the first rotating shaft 23, and located between the rotary disk 20 and the support plate 22. A guide groove 25 is formed in an inner wall of the sleeve 24 and extends along an axial direction of the sleeve 24. A fixed strip 26 is arranged on an outer wall of the first rotating shaft 23 and is engaged in the guide groove 25. A gear 27 is arranged on an outer wall of one end of the sleeve 24, and a first bevel gear 28 is arranged on an outer wall of the other end of the sleeve 24.

The semicircular shifting fork 29 is engaged with the sleeve 24, and is located between the gear 27 and the first bevel gear 28. One end of a second connecting rod 30 is connected with the semicircular shifting fork 29, and the other end of the second connecting rod 30 is connected with an outer wall of the sliding sleeve 17.

The second bevel gear 31 is arranged between the gear 27 and the first bevel gear 28. One end of a second rotating shaft 32 is connected with the second bevel gear 31, and the other end of the second rotating shaft 32 passes through a wall of the first air duct 1 and is connected with an impeller 33 arranged in the first air duct 1. The second rotating shaft 32 is rotatable connected with the wall of the first air duct 1.

The above technical solution has following working principles and beneficial technical effects. When an air speed of an air entering the second air duct 2 increases, the air will push the air plate 9, the connecting post 12 and the first magnet 13 to move upwards, and hence stretch the first spring 41. Through a magnetic repulsion force of the first magnet 13 and the second magnet 18, the sliding sleeve 17 moves up along the first connecting rod 16 and the second spring 19 is stretched, so as to move the second connecting rod 30 and the semicircular shifting fork 29 upwards. The semicircular shifting fork 29 shifts the sleeve 24 upwards, and the gear 27 is engaged into the engaging groove 21. By the fixed engagement of the gear 27 and the tooth slot, the motor 15 drives the rotary disk 20 and the gear 27 to rotate, and correspondingly drives the first bevel gear 28 to rotate. Since the first bevel gear 28 also moves upwards to be meshed with the second bevel gear 31, the second bevel gear 31 is driven to rotate, and then the rotation of the second bevel gear 31 drives the rotating shaft 32 and the impeller 33 to rotate at a high speed. The impeller 33 improves an air flowing speed in the first air duct 1, such that the heating or cooling efficiency of the air at the air outlet is higher, which can meet the heat exchange efficiency of the outdoor air at the high air speed. When the air speed of the air entering the second air duct 2 decreases, the air plate 19 moves downward, and the gear 27 moves out of the engaging groove 21 correspondingly. Thus, the power of the motor 15 is not accessed, the impeller 33 hence stops rotating, and the air flowing speed in the first air duct 1 does not change. Thus, the intelligent regulation of the air speeds in the air input channel 49 and the first air duct 1 can be achieved.

In some embodiments of the present disclosure, a first baffle 34 is arranged above the motor 15, and a second baffle 35 is arranged below the support plate 22. A normally closed switch 36 is arranged on the support plate 22. A compression rod 37 is provided. One end of the compression rod 37 is connected with the second connecting rod 30, and the other end of the compression rod 37 is in contact with the normally closed switch 36. A bottom end of the support plate 22 is provided with a case 38, and the case 38 is provided with a battery 39 therein. An electric heating bar 40 is arranged on the inner wall of the first air duct 1 and is located below the impeller 33. The normally closed switch 36 is electrically connected with the battery 39 and the battery 39 is electrically connected with the electric heating bar 40.

The above technical solution can have following working principles and beneficial technical effects. When an air speed of an air in the second air duct 2 increases, the second connecting rod 30 moves upwards to drive the compression rod 37 to move away from the normally closed switch 36, such that the electric heating bar 40 is turned on, and the air blown by the impeller 33 is heated, thereby improving the heating efficiency. When the air speed in the air input channel 49 decreases, the second connecting rod 30 moves downwards to drive the compression rod 37 to be in contact with the normally closed switch 36, such that the electric heating bar 40 is turned off and stops heating, thereby achieving the intelligent heating of the electric heating bar 40 according to the change of the air speed in the second air duct 2.

Obviously, those skilled in the art can make various changes and modifications to the present disclosure without departing from the spirit and scope thereof. Thus, if these changes and modifications of the present disclosure fall within the scope of the claims of the present disclosure and the equivalent technologies, the present disclosure also intends to include these changes and modifications.

The invention claimed is:

1. An air duct device, comprising:
a first air duct having an air inlet and an air outlet; and
a second air duct having an air input channel passing through the first air duct and passing by the air outlet of the first air duct, to allow an outdoor air entering the second air duct from the air input channel to be heated or cooled by a heat exchanger air at the air outlet of the first air duct, and an air outlet in communication with the first air duct, to allow the outdoor air preheated or precooled by the air outlet of the first air duct to be transported to the air inlet of the first air duct to converge with the heat exchange air in the air outlet of the first air duct,
wherein the air inlet of the first air duct and the air outlet of the first air duct communicate air with an indoor environment.

2. The air duct device according to claim 1, further comprising:
a housing having the first air duct and the second air duct arranged therein; and
a baffle that is arranged in the housing and configured to isolate the first air duct from the second air duct, where the baffle includes a hole through which the air input channel of the second air duct passes.

3. The air duct device according to claim 2, wherein:
the first air duct is a heat-exchange air duct, where the air inlet of the first air duct is an inlet of the heat-exchange air duct and the air outlet of the first air duct is an outlet of the heat-exchange air duct, and
the duct device further comprises a heat exchange unit that is arranged between the inlet of the heat-exchange air duct and the outlet of the heat-exchange air duct, and the air input channel of the second air duct is arranged inside the housing adjacent to the outlet of the heat-exchange air duct.

4. The air duct device according to claim 3, wherein the heat exchange unit further comprises:
a heat exchange fin having a U-shaped structure with an end of the U-shaped structure facing away from an opening thereof and being orientated towards the inlet of the heat-exchange air duct, the outlet of the heat-exchange air duct being arranged adjacent to the opening of the U-shaped structure; and a first fan that is fixed inside the housing adjacent to the opening of the U-shaped structure of the heat exchange fin.

5. The air duct device according to claim 4, wherein the air outlet of the second air duct is arranged in the baffle, and the second air duct is provided with an air output pipe extending into the first air duct.

6. The air duct device according to claim 5, wherein the air output pipe extends from the outlet of the second air duct to a side of the first air duct away from the second air duct, and a surface of the air output pipe adjacent to the heat exchange unit is provided with a plurality of flow equalization holes that are spaced apart from one another.

7. The air duct device according to claim 5, wherein an air direction of the air output pipe of the second air duct is perpendicular to an air direction of the inlet of the heat-exchange air duct.

8. The air duct device according to claim 5, wherein the air output pipe of the second air duct is arranged between the heat exchange unit and the inlet of the heat-exchange air duct.

9. The air duct device according to claim 5, wherein the air output pipe of the second air duct is arranged in the opening of the U-shaped structure of the heat exchange fin, and is located above the first fan.

10. The air duct device according to claim 2, wherein the second air duct is a ventilation duct, the air outlet of the second air duct is a fresh air outlet that is in communication with the air outlet of the first air duct, and the air input channel passes through the baffle and goes by the air outlet of the first air duct.

11. The air duct device according to claim 10, wherein the second air duct further comprises a purification chamber arranged between the fresh air outlet and the air input channel.

12. The air duct device according to claim 11, wherein the air input channel further comprises an outdoor air inlet arranged at a side of the air outlet of the first air duct away from the second air duct, and the outdoor air inlet passes through a side wall of the housing to be in communication with an outdoor environment.

13. The air duct device according to claim 11, wherein the purification chamber is provided with a filter and a second fan therein, and the second fan is arranged between the filter and the fresh air outlet.

14. The air duct device according to claim 3, wherein an air direction of the air input channel is perpendicular to an air direction of the inlet of the heat-exchange air duct.

15. The air duct device according to claim 1, further comprising an air speed regulating device that includes:
a power chamber arranged between the first air duct and the second air duct, and including a receptacle therein;
an air plate arranged in the second air duct;
a guide port arranged in a wall of the second air duct and extending along a length direction thereof, the guide port being in communication with the receptacle;
a connecting post having an end that is connected with the air plate and another end passing through the guide port, the connecting post extending into the receptacle and being connected with a first magnet, the receptacle being provided with a first spring therein having one end connected with the first magnet and another end connected with a bottom of an inner wall of the receptacle, and the first magnet being configured to reciprocate up and down in the receptacle;
a support rod having one end connected with an inner wall of the power chamber and another end connected with an outer wall of a motor, an output shaft of the motor facing downwards and being connected with a rotary disk, and a bottom end of the rotary disk being provided with a circular engaging groove and having tooth slots formed in an inner wall of the engaging groove along a circumferential direction;
a first connecting rod having one end that is connected with an upper end of the receptacle and another end that is connected with the support rod;
a sliding sleeve fitted over the first connecting rod that is configured to reciprocate up and down along the first connecting rod, a second magnet being arranged to a lower end of the sliding sleeve, and magnetic poles of the first magnet and the second magnet being opposite;
a second spring fitted over the first connecting rod having one end of the second spring being connected with the second magnet and another end of the second spring being connected with a top end of the receptacle;
a support plate arranged below the receptacle;
a first rotating shaft arranged on the support plate having one end being rotatably connected with the support plate and another end extending towards the engaging groove;
a sleeve fitted over the first rotating shaft that is located between the rotary disk and the support plate, a guide groove being formed in an inner wall of the sleeve and extending along an axial direction of the sleeve, a fixed strip being arranged on an outer wall of the first rotating shaft and engaged in the guide groove, a gear being arranged on an outer wall of one end of the sleeve, and a first bevel gear being arranged on an outer wall of the other end of the sleeve;
a semicircular shifting fork engaged with the sleeve that is located between the gear and the first bevel gear;
a second connecting rod having one end that is connected with the semicircular shifting fork and another end that is connected with an outer wall of the sliding sleeve;
a second bevel gear arranged between the gear and the first bevel gear; and
a second rotating shaft having one end that is connected with the second bevel gear and another end passing through a wall of the first air duct and being connected with an impeller arranged in the first air duct, and the second rotating shaft being rotatably connected with the wall of the first air duct.

16. The air duct device according to claim 15, further comprising:
a normally closed switch arranged on the support plate;
a compression rod having one end that is connected with the second connecting rod and another end that is in contact with the normally closed switch;
a case arranged to a bottom end of the support plate;
a battery arranged in the case that is electrically connected with the normally closed switch; and
an electric heating bar arranged on the inner wall of the first air duct and located below the impeller, and the battery being electrically connected with the electric heating bar.

17. An air handling apparatus including an air duct device that comprises:
a first air duct having an air inlet and an air outlet; and
a second air duct having an air input channel passing through the first air duct and passing by the air outlet of the first air duct, to allow an outdoor air entering the second air duct from the air input channel to be heated or cooled by a heat exchanger air at the air outlet of the first air duct, and an air outlet communicated with the first air duct, to allow the outdoor air preheated or precooled by the air outlet of the first air duct to be transported to the air inlet of the first air duct to converge with the heat exchange air in the air outlet of the first air duct, wherein the air inlet of the first air duct and the air outlet of the first air duct communicate air with an indoor environment.

18. The air handling apparatus according to claim 17, further comprising:

a housing having the first air duct and the second air duct that are arranged therein; and a baffle that is arranged in the housing that is configured to isolate the first air duct from the second air duct, and the baffle including a hole through which the air input channel of the second air duct passes.

19. The air handling apparatus according to claim 18, wherein:

the first air duct is a heat-exchange air duct, where an air inlet of the first air duct is an inlet of the heat-exchange air duct and an air outlet of the first air duct is an outlet of the heat-exchange air duct, and the duct device further comprises a heat exchange unit arranged between the inlet of the heat-exchange air duct and the outlet of the heat-exchange air duct, and the air input channel of the second air duct is arranged inside the housing adjacent to the outlet of the heat-exchange air duct.

20. The air handling apparatus according to claim 18, wherein:

the second air duct is a ventilation duct, the air outlet of the second air duct is a fresh air outlet, the fresh air outlet is in communication with the air outlet of the first air duct, and the air input channel passes through the baffle and goes by the air outlet of the first air duct, and the air input channel includes an outdoor air inlet arranged at a side of the air outlet of the first air duct away from the second air duct, and the outdoor air inlet passes through a side wall of the housing to be in communication with an outdoor environment.

* * * * *